United States Patent [19]
Doll et al.

[11] 3,868,896
[45] Mar. 4, 1975

[54] VEHICLE CAB ENCLOSURE WITH VENTILATION MEANS

[75] Inventors: Robert M. Doll, Farmington; Joseph L. Jessup, Detroit; Lawrence J. Stone, Livonia, all of Mich.

[73] Assignee: Massey-Ferguson Inc., Detroit, Mich.

[22] Filed: Mar. 28, 1973

[21] Appl. No.: 345,807

[52] U.S. Cl. .................... 98/2.11, 98/2.15
[51] Int. Cl. ............................. B60h 1/24
[58] Field of Search ....... 98/2.11, 2.14, 2.15, 2.07; 55/487

[56] References Cited
UNITED STATES PATENTS

| | | | |
|---|---|---|---|
| 3,472,147 | 10/1969 | Gossller | 98/2.11 |
| 3,522,839 | 8/1970 | Werdt | 98/2.11 |
| 3,555,846 | 1/1971 | Harbeck | 98/2.07 |
| 3,657,992 | 4/1972 | Minnick | 98/2.11 |
| 3,738,621 | 6/1973 | Anderson | 98/2.14 |

*Primary Examiner*—Meyer Perlin
*Attorney, Agent, or Firm*—Robert L. Farris; George C. Bower

[57] ABSTRACT

A vehicle cab enclosure has a forced air ventilation system including a horizontally arranged intake and filter. The cab is otherwise relatively air tight so that sudden closing of the cab door causes a reverse flow of air through the filter and a loosening of particles thereon. The ventilation system also includes a central air plenum chamber connecting a blower with a pair of side chambers having vents into the cab interior. Heat exchanger means can be provided as can recirculation means.

7 Claims, 9 Drawing Figures

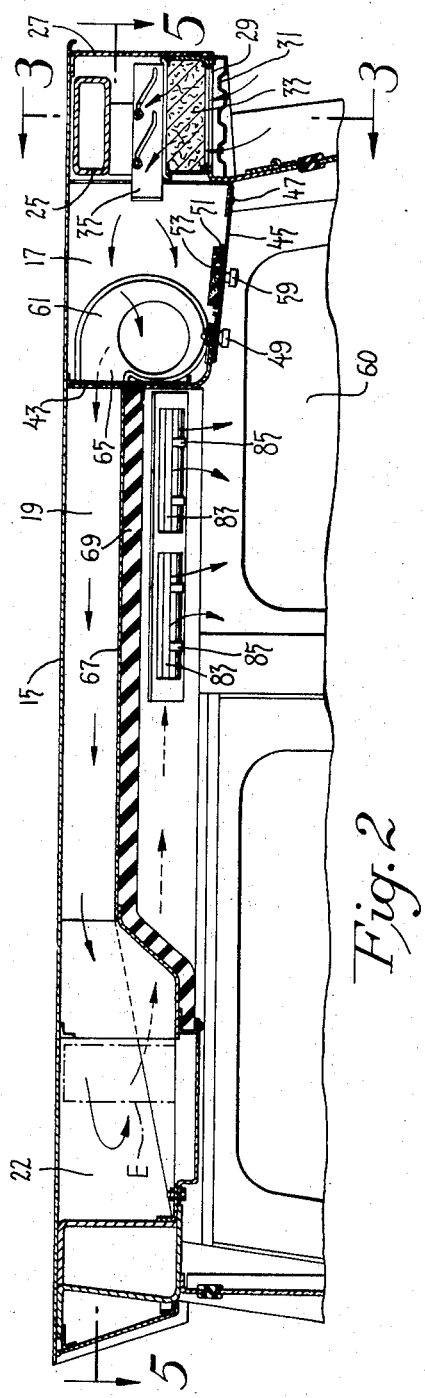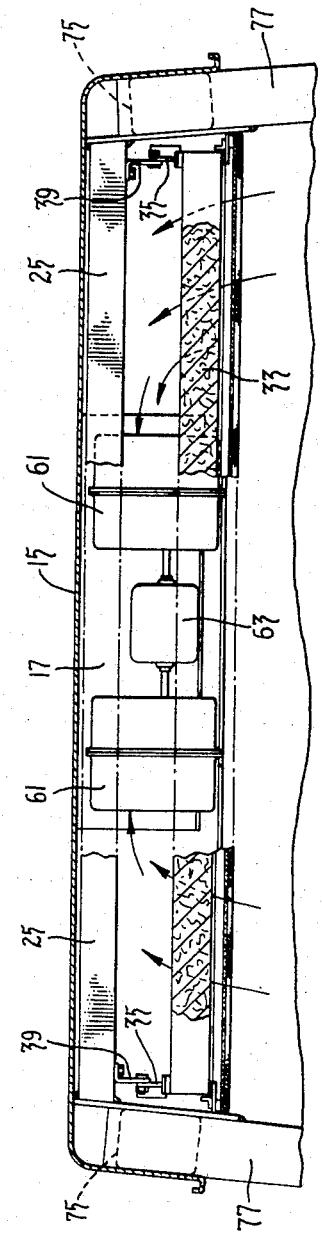

VEHICLE CAB ENCLOSURE WITH VENTILATION MEANS

This invention relates to a cab for a vehicle such as a tractor and more particularly relates to a forced air ventilating system for such a cab.

The operation of vehicles such as agriculture tractors under adverse environmental conditions requires means for protecting the vehicle operator from dust, noise and air temperature extremes. A vehicle cab designed to afford such protection requires a forced air ventilation system having means to efficiently filter out dust and noise from outside air, at times, heat or cool such outside air and distribute the same inside the cab without directly blowing on the operator. It is desirable to provide a ventilating system having a relatively large flow volume capacity so that the desired degree of comfort can be obtained without objectable high air velocities.

When operating in extremely dirty and dusty conditions any noise and dirt filters will tend to load up rapidly with reduced efficiency. Constant changing or cleaning of such filters can be time consuming, inconvenient and often forgot.

It is therefore an object of the invention to provide a ventilating system for a vehicle cab that has a self-cleaning filter.

Another object is to provide a ventilating system that provides for the forced air to be discharged at the interior sides of the cab headliner thus providing circulation without a direct draft in the operator's face.

A further object is to provide such a ventilating system that provides for controlled circulation and recirculation of air into and within the cab.

These and other objects and advantages will be readily apparent from the following description and accompanying drawings in which:

FIG. 2 is an enlarged cross section of the upper portion of the cab showing the ventilating system;

FIG. 3 is a cross sectional view taken on the line 3—3 of FIG. 2 showing the air intake arrangement.

Figure 1:
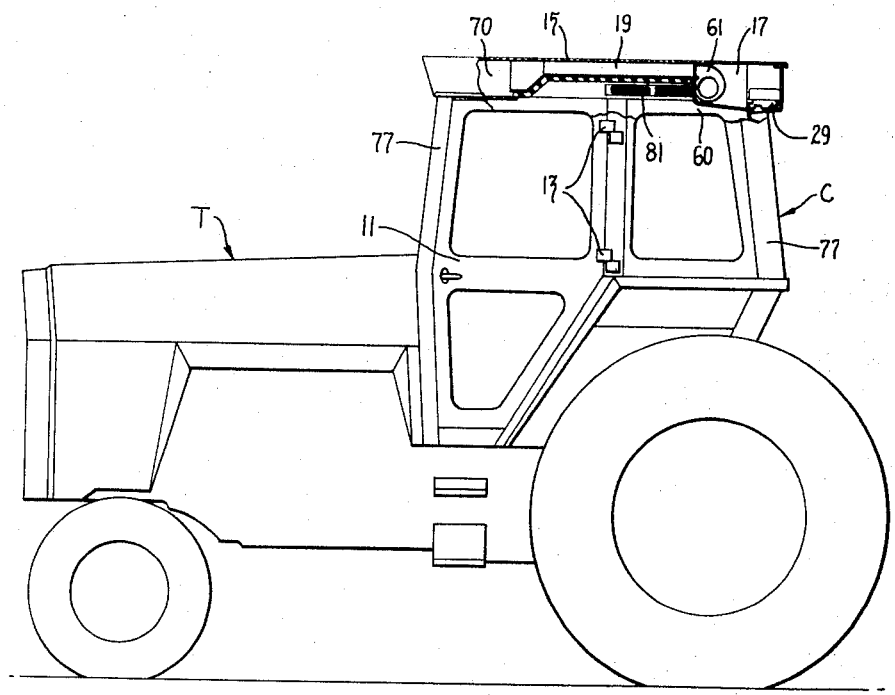
FIG. 1 shows a typical tractor having a cab incorporating the invention.

The preferred embodiment of the system shown in the Figures includes, as is shown in FIG. 1, a cab enclosure generally indicated C either permanently or removably mounted on a tractor T. The cab includes a door 11 supported on hinges 13 arranged to be swung open to permit entry and exit of the operator.

Figure 5:
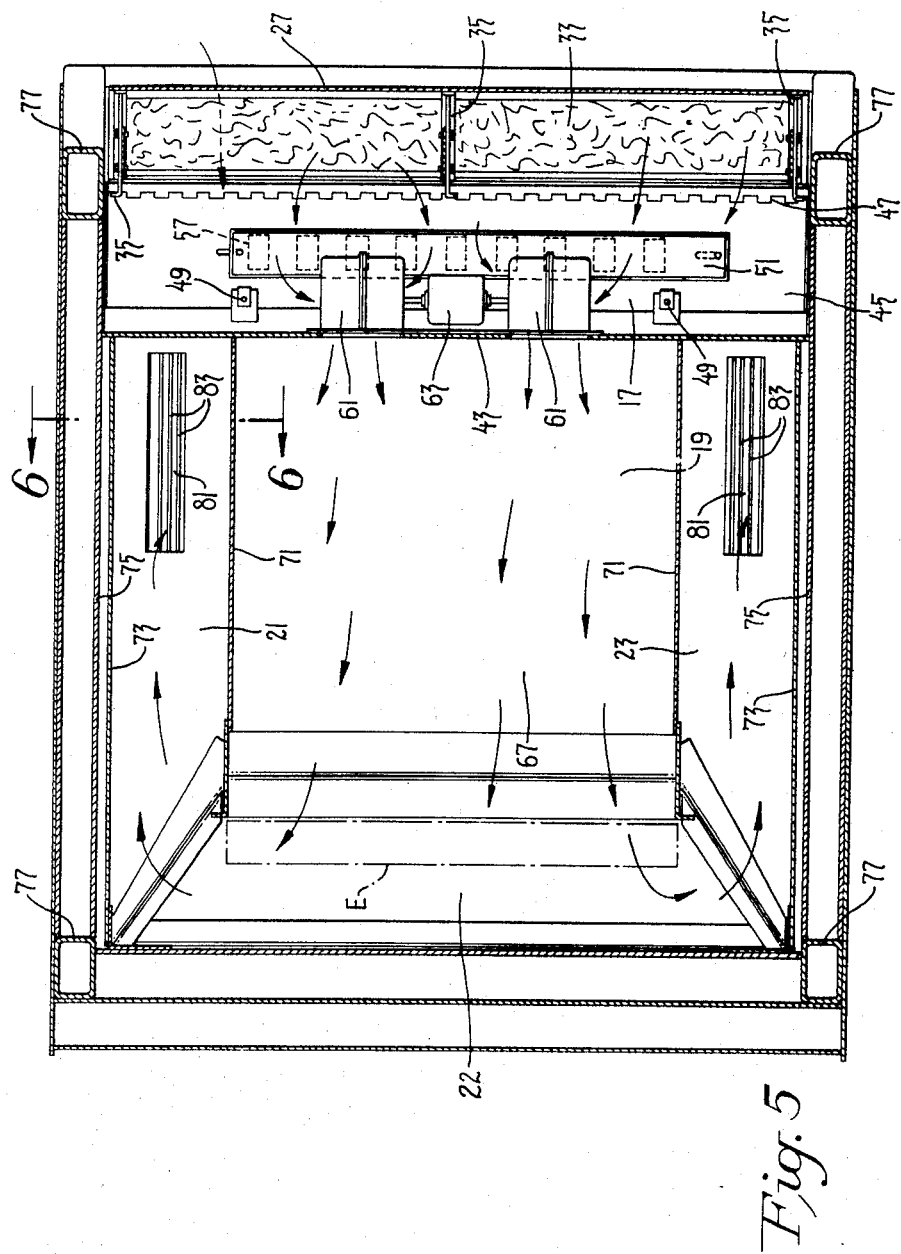
FIG. 5 is a cross sectional view taken on the line 5—5 of FIG. 2 and showing what would be seen looking down on the cab with the roof removed.

The cab includes a ventilation system generally located in the upper portion of the cab. The roof 15 serves as the top closure of the five air plenum chambers 17, 19, 21, 22 and 23 (FIG. 5). The upper portion of the cab includes a transversely extending rear overhang section that encloses a structural box shaped frame member 25 (FIG. 2). The rear and lower portions of the overhang section are formed by a wall 27 that serves as the rear enclosure wall of the cab. The bottom of the overhang section includes an air intake opening 29 formed in the wall 27 and extending substantially across the width of the cab. A corrugated perforated screen 31 prevents large foreign particles from entering the intake.

A removable filter member 33 covers the opening 29 and is held in place by three locking members 35 bearing against straps 42. The locking members are movably supported by bolts 37 carried by three brackets 39 supported on the frame member 25. Cam slots 41 formed in the locking members 35 permit the raising of the same to permit the filter 33 to be removed and replaced from inside the cab through the door 45.

Figure 8:
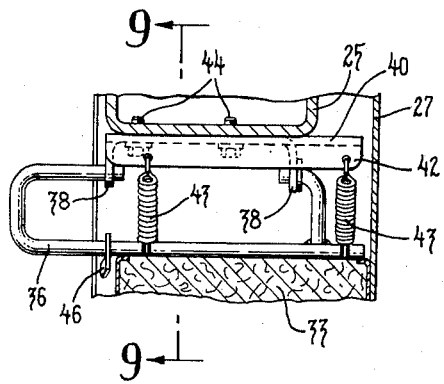
FIG. 8 is a side view of a preferred embodiment of the filter clamping means with the filter in place.
Figure 9:
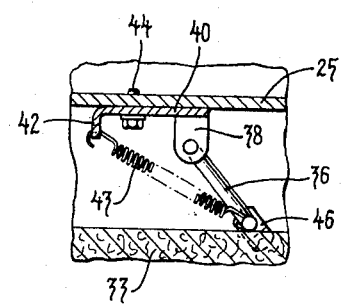
FIG. 9 is a sectional view taken along line 9—9 of FIG. 8.

The preferred apparatus (FIGS. 8 and 9) of holding the filter 33 in place is by the pivotally mounted members 36 in tabs 38 of the member 40, only one clamp of the two clamps is shown. The tabs 38 and flanges 42 extend downward from the members 40 and are spaced above the filter member 33. The members 36 are pivoted to the tabs in an over center condition and held against the filter by springs 43 anchored to the flange 42 of each member 40. The members 40 are attached to the frame member 25 spaced above the filter member 33 by fastening means 44. The stops 46 are attached to members 36 to prevent the filter from moving forward in the locked condition.

Figure 4:
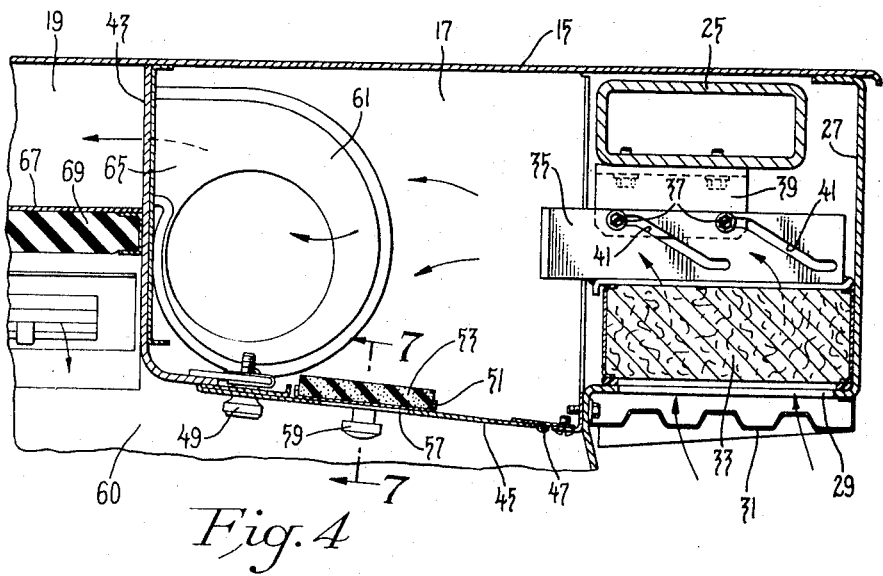
FIG. 4 is a further enlarged view of a portion of FIG. 2 showing more details.
Figure 7:
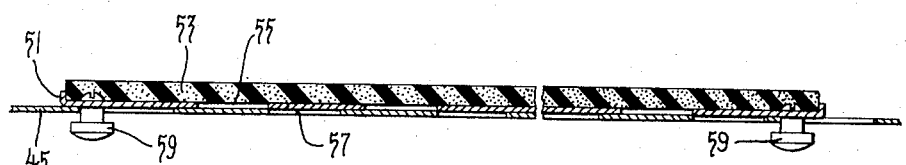
FIG. 7 is a cross sectional view taken on the line 7—7 of FIG. 4.

Plenum chamber 17 (FIG. 4) is formed by the roof 15, fixed spaced rearwalls 43 and 27 and the pivoted access door 45 hinged at 47 and held closed by a pair of screw locks 49. A slidable recirculation control panel member 51 includes a filter member 53 and a plurality of apertures 55 (FIG. 7) adapted to be aligned or misaligned with apertures 57 formed in the door 45. Knobs 59 (FIG. 2) permit the operator to slide the panel 51 to control the amount of air that can pass from the cab interior 60 into chamber 17.

A pair of blowers 61 are located in the chamber 17 and are connected to be driven by a common electric motor 63 (FIGS. 3 and 5). The sides of the blowers 61 (FIG. 2) form intakes and the tangential output portion 65 connects through openings formed in the wall 43 into the central chamber 19. The chamber 19 is closed at its bottom by a member 67 spaced from the roof 15 and having secured to member 67 noise and temperature insulation material 69. Side walls 71 extending to the roof 15 and horizontal floor member 67 serve to separate chamber 19 from the side chambers 21 and 23 (FIG. 5). The chambers 19, 21 and 23 are connected at their forward ends by a chamber 22.

An optional heat exchangers generally indicated E can be incorporated in the chamber 22. Such a heat exchangers can provide either heating, cooling or both heating and cooling of the air passing from chamber 19 to chambers 21 and 23.

Figure 6:
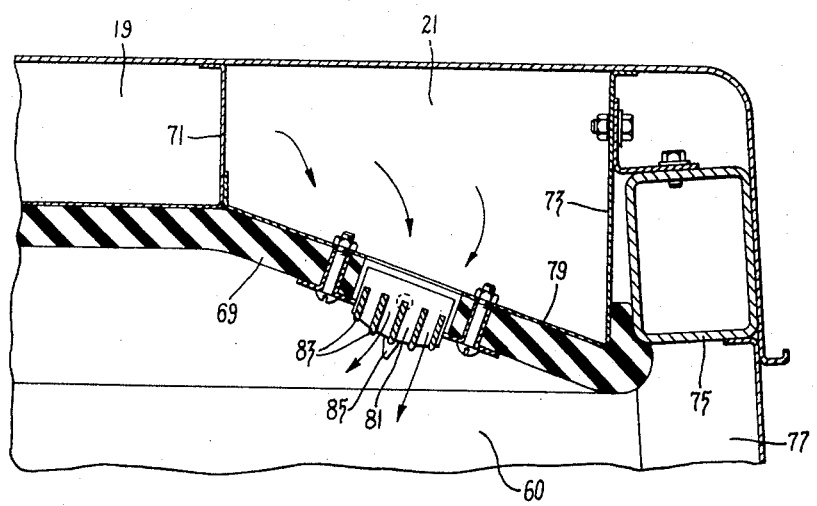
FIG. 6 is a cross section taken on the line 6—6 of FIG. 5 showing the adjustable air vents.

The chambers 21 and 23 are formed, as best seen in FIG. 5 by the walls 71, outside panels 73 and rear wall 43. The sides of the cab include additional horizontally extending structural box frame members 75 which are connected to four vertical frame members 77. As seen in FIG. 3 the roof 15 curves down over the frame members 75. The lower portion of the side chambers 21 and 23 is formed by panels 79 (FIG. 6) formed as a bent portion of the outer panels 73. The insulation 69 continues underneath the panels 79.

Air in chambers 21 and 23 can be directed from the sides into the cab interior 60 through air flow control louvres 81 having pivoted vanes 83 and adjusting knob 85.

Operation of the ventilation system is as follows. The blowers 61 act to draw air through the grill 31, air intake opening 29 and filter 33 into chamber 17 and to discharge the same into chamber 19. By controlling the position of panel 51 a variable amount of air can also be drawn from the cab interior 60 through apertures 57 and 55 and filter 53 into the chamber 17. Air from the blowers 61 is forced into chamber 19 forwardly into the junction chamber 22 and then into the side chambers 21 and 23. The air passes through the heat exchanger E and reverses its direction to flow rearward through chambers 21 and 23 and out of the adjustable vents 85.

The cab interior 60 is relatively sealed except for the intake 29 and the door and windows and thus with the door and windows closed intake 29 serves as the major path for any flow of air out of the cab. The forced air blowers have adequate capacity to draw air through the intake and maintain an interior pressure sufficient to prevent ingress of dust and dirt through various small openings around the control apertures, etc. These openings represent a small combined area relative to the intake opening 29. If with the windows closed the door 11 is rapidly closed there will be a sudden build up of air pressure inside the cab and some air will be forced in a reverse direction through the ventilating system out through the filter 33 and intake opening 29. This reverse flow will loosen particles collected on the lower surface of the filter 33 and they will fall through the screen 31 down toward the ground. Thus everytime the operator enters or exits the action of closing the door will cause the filter to be cleaned to maintain its efficiency and increase the period of time between filter changes.

The plenum chamber and adjustable vent arrangement permits a relatively large amount of air to be directed inside the cab without directly blowing on the face of the operator. The louvres on the sides direct the forced air from the sides, either up or down or forward or rearward.

What is claimed is:

1. In a vehicle cab enclosure including a forced air ventilation system, a forced air means for drawing air from outside the cab, means for distributing air from the forced air means in the cab, an air intake opening connected to the forced air means and providing for air entering or leaving the cab, filter and screen in said air intake opening, a cab door swingable between an open position and a closed position, and characterized by said filter having a lower outwardly exposed surface facing downward and facing said opening so that air passing from outside the cab to said forced air means moves upward through the filter, said air intake opening constituting the major path for air leaving the cab when the door is closed so that as the door is rapidly swung from its open to its closed position there is sudden flow of air in a reverse direction through said forced air means and said filter and screen, whereby foreign particles collected on the lower outwardly exposed surface of the filter are loosened and fall away by gravitational force.

2. In a cab enclosure of claim 1 wherein the air intake opening is horizontally arranged and said filter is removably located across the opening.

3. In a vehicle cab enclosure including a forced air ventilation system arranged in the upper portion of the cab, an air intake opening, filter in said opening, blower means having an intake connected to said air intake opening, a first central plenum chamber extending fore and aft along the length of the top of the cab and connected at one end to the output of the blower means, second and third side plenum chambers arranged laterally outward of said central chamber and connected thereto at the end opposite to the blower means connected to the end of the central chamber, vent means in said second and third chambers opening into the cab interior for directing air.

4. In a cab of claim 3 wherein adjustable bypass means are provided to allow controlled recirculation of air from the interior of the cab into the blower means intake.

5. The cab of claim 3 wherein the cab enclosure has a door swingable between open and closed positions and wherein said air intake opening constitutes the major path for flow of air between the interior and exterior of the cab when the door is closed so that rapid swinging of the door to a closed position causes a sudden flow of air out through said air intake opening and through the filter means therein to dislodge foreign particles on the outside surface thereof.

6. In a cab of claim 5 wherein said filter means is substantially horizontally arranged with the intake surface extending downward whereby dislodged particles will fall away by gravity.

7. In a vehicle cab enclosure including a forced air ventilation system arranged in the upper portion of the cab, an air intake opening, filter means in said opening, blower means having an intake connected to said air intake, a first central plenum chamber extending for and aft along the length of the top of the cab and connected at one end to the output of the blower means, second and third side plenum chambers arranged laterally outward of said central chamber and connected thereto at the end opposite to the blower means connected to the end of the central chamber, vent means in said second and third chambers opening into the cab interior for directing air and heat exchanger means are located at the junction between the central chamber and the side chambers.

* * * * *